Aug. 8, 1950     J. R. COONEY     2,517,844
FISH LURE
Filed Aug. 11, 1948
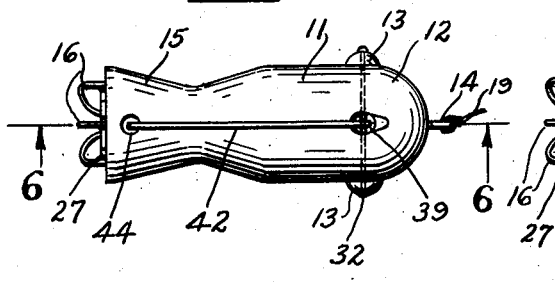
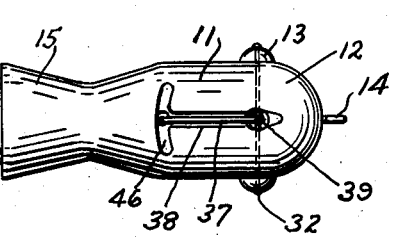
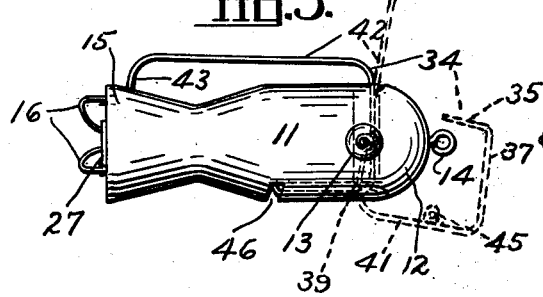
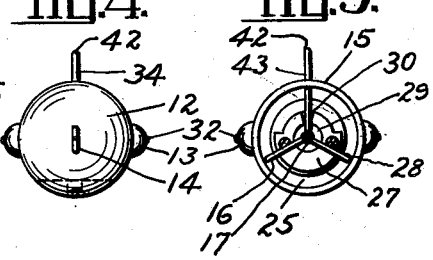
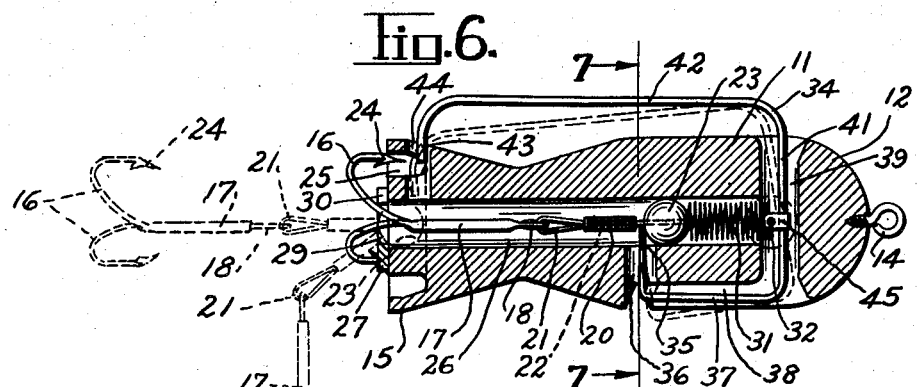
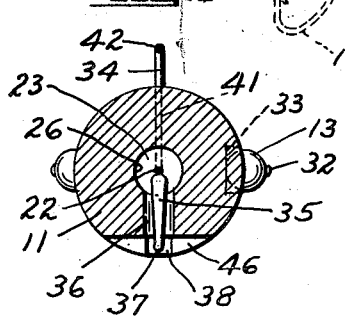
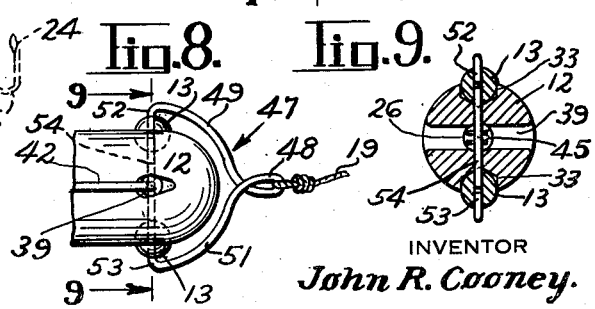
INVENTOR
*John R. Cooney.*
BY
*Walter S. Edwards.*
ATTORNEY Patented Aug. 8, 1950

2,517,844

UNITED STATES PATENT OFFICE 2,517,844

FISH LURE

John R. Cooney, North Guilford, Conn.

Application August 11, 1948, Serial No. 43,569

4 Claims. (Cl. 43—35)

This invention relates to fish lures and more particularly to fish lures of the type known as plugs, or artificial bait, and wherein means is provided to project the hook, or hooks outwardly from a protecting casing at the event of a strike, or an attempt by the fish to grasp the lure, or plug.

Fish lures of the above type, to be particularly efficient in use, should preferably be; rapid in action; adapted for operation at a short strike, when the fish only partially takes the plug; be adapted to use standard hooks; be provided with means whereby the hooks are free to rotate and swing; be readily disassembled for replacement of parts, or repair; have operating means which is completely protected from damage by a fighting fish; and be of such form and structure that it will not be readily entangled in weeds, grasses, etc., through which it may be trolled.

One object of this invention is to provide a fish lure of such structure that the above desirable results will be obtained.

Another object is to provide a fish lure which will be relatively inexpensive to manufacture, readily disassembled, simple in construction, pleasing in appearance, compact, and very efficient and durable in use.

With the above and other objects in view, which will appear as the description proceeds, there has been illustrated in the accompanying drawings, one form in which the features and principles of this invention may be conveniently and practically embodied.

In the drawings:

Figure 1, is a top plan view of a fish lure embodying the features and principles of this invention in its structure;

Figure 2, is a bottom view of the same;

Figure 3, is a side view of the same;

Figure 4, is a view of one end of the same;

Figure 5, is a view of the other end of the same;

Figure 6, is an enlarged sectional view taken on the line 6—6 of Figure 1;

Figure 7, is a cross-sectional view taken on the line 7—7 of Figure 6;

Figure 8, is a top view of the front end of a lure having a different form of line attacking means; and Figure 9, is a cross-sectional view taken on the line 9—9 of Figure 8.

Referring now to the drawings wherein like reference numerals designate like parts throughout the several views, the numeral 11 denotes a body preferably made of plastic and molded, in this instance, in the form of artificial bait simulating a fish by having a cylindrical front end portion 12, with beads 13 for eyes, a loop 14 for the line, and an outwardly flared rear end portion 15 which, in combination with sligthly projecting hooks 16 simulates a fish tail. Obviously the body 11 may be made to simulate other forms of bait. The hooks 16, as herein shown, are three in number with their shanks 17 secured together and having a loop 18 at the extreme end for attachment to a line. A four prong set of hooks, or even a single prong hook, may be used with the device of this invention with equally efficient results. In all instances the hook, or sets of hooks, are of standard form and may be purchased from regular fishing tackle dealers.

The hook loop 18, instead of being directly connected to a line 19, is connected to a loop 21 for free swinging movement in respect thereto, the line 19 being connected to the loop, or screw eye, 14. The loop 21 has a shank 22 which extends away from the loop 21 and through a spherical member, or ball, 23. The shank 22 is suitably secured to the ball 23 against removal therefrom while allowing the ball 23 to rotate thereon. Thus the hooks 16 may swing in any direction, due to the loop connections, and swivel in respect to the ball 23. As shown, the shank 22 is of wire with an end spun over after being inserted through the ball and with its other end bent back upon itself and forming the loop 21 and having a wire 20 coiled about it to prevent separation of the end from the portion it overlaps.

In their, or its, retracted and set positions, see full lines in Figure 6, the hook barbs, or barb, 24 are disposed in an annular recess 25 formed in the tail end 15 of the lure body 11. The ball 23, loop 21 and its shank 22, with the hook shank 17, extend forwardly into a bore 26 provided in the lure body 11. After insertion of the above parts into the bore 26, a plate 27, disposed over the bore 26 at the tail end of the lure, is attached thereto by screws 28. The plate 27 has an opening 29 therethrough to permit passage of the hook shank 17, the loops 18 and 21, and the shank 22 rearwardly, but is smaller in diameter than the ball 23 to act as a stop for the same, preventing it from being removed from the bore 26 while not interfering with its swivel action. The plate 27 is provided with a clearance notch 30 leading into communication with the opening 29 whereby the hook shanks 17 will pass laterally through the notch 30 when the plate 27 is being assembled to the lure body 11.

A coiled spring 31 is disposed in the bore 25 and reacts between the ball 23 and a transverse pin 32 which extends through the body 11. In this instance the pin also passes through the beads 13 to retain them to the body 11 in depressions 33 provided to receive them in the body 11. The spring 31 is tensioned to constantly urge the ball with the attached hooks 16 rearwardly and out of the bore 26, see dotted lines in Figure 6. The ball 23 with the attached hooks 16 are releasably retained in the set position, see full lines in Figure 6, by a trigger 34, the catch end 35 of which is flattened and extended through a cross-bore 36 into the bore 26 and disposed in the path of movement of the ball 23 rearwardly, to engage it and hold it against action by the spring 31. The catch end 35 of the trigger 34 is bent inwardly from a longitudinal portion 37 which extends forwardly, in a groove 38, provided in the bottom of the lure body 11 to another cross-bore 39. The cross-bore 39 is disposed closely adjacent to the front end 12 of the lure and extends entirely through the lure body 11 intersecting the bore 26 at its forward end. Another portion 41 of the trigger 34 extends upwardly through the cross-bore 39 and from it a portion 42 extends rearwardly along the upper surface of the lure body 11 and has its rear end 43 turned into a cross-bore 44 disposed closely adjacent to the tail end 15 of the lure. The trigger 34 is pivoted to swing, in this instance, on the transverse pin 32, by the use of a clip 45 secured to the trigger portion 41, and being swingably attached to the pin 32.

The trigger is assembled to the lure body 11 by threading the rear end 43 upwardly through the cross-bore 39, see dotted lines in Figure 3, then swinging the portion 42 rearwardly and downwardly to dispose the portion 41 in the cross-bore 39. The long trigger portion 42 is then swung forwardly to rotate the trigger and move the catch end 35 along the cross-groove 46 until this end 35 aligns with the cross-bore 36. The trigger is then pressed upwardly to dispose the catch end 35 in the bore 36. The rear end 43 is then sprung into the bore 44. The trigger 34 is now manipulated to align a pin hole in the clip 45 with the pin 32, which is then inserted through the eye beads 13 and the clip 45 to retain the parts in place.

Due to the structure above described the operating mechanism is thoroughly protected by being completely enclosed by the body 11. The provision of a relatively long shank 22 attached to and extending rearwardly from the ball 23, and by using a standard hook 16 with a shank 17 extending rearwardly from the shank 22, insures that the hooks, or hook, 16 will be completely projected from the bore 26 of the body 11 so that full benefit of the swinging action between the shanks 17 and 22, and the swivel action between the shank 22 and the ball 23, will be obtained as well as disposing the hook, or hooks, 16 a sufficient amount to the rear of the body 11 to prevent a fighting fish from possibly damaging the lure. The trigger catch end 35 engages the ball 23 at a point forward of the middle of the body 11 so as to sufficiently compress the spring 31 and to insure that the hook barbs, or barb, 24 are concealed in the annular recess 25.

Figures 8 and 9 illustrate a somewhat different form of means whereby the line 19 may be attached to the body 11. In this form a bail 47 is provided, having a loop 48 and spread apart arms 49 and 51 extending rearwardly from the loop 48. The ends 52 and 53 of the arms 49 and 51 respectively are inserted substantially half way into the head eyes 13. The bail is spring tempered to constantly urge the ends 52 and 53 into the head eyes 13. A pin 54 extends between the opposing bail ends 52 and 53, its ends extending substantially half way into the head eyes 13. The pin 54 is threaded through the clip 45 to retain the trigger 34 in place. To disassemble the trigger 34 from the body 11, the bail 47 is manipulated to remove its ends 52 and 53 from the head eyes 13 and the pin 54 is shaken out.

In operation, the lure is attached to the end of a line 19 by tying it to the screw-eye 14 or to the bail 47 and the hooks 16 are pressed into the body 11 until the trigger catch end 35 may be pressed inwardly into the body 11 to engage the ball 23 upon its rear surface. The lure is then cast into the water and trolled slowly through the water and, due to it having no sharp protruding surfaces, edges, or points, readily slips through weeds and grasses without becoming entangled therewith. When a fish strikes and the lure enters its mouth, the trigger is tripped due to the engagement of the fish's mouth with the trigger portion 42 at any point along its length from closely adjacent the tail end 15 of the body 11 to closely adjacent its forward end 12. When the trigger portion 42 is so acted upon to press it inwardly, the trigger 34 is swung on the pivot pin 32 to cause the trigger catch end 35 to be moved out of the path of the ball 23, see dotted lines in Figure 6, whereupon the spring 31 rapidly forces the ball 23 rearwardly, and the hooks 16 completely out of the body 11, and into the mouth of the fish. Due to the universal joint action between the shanks 17 and 22 and between the shank 22 and the ball 23, the fish, in fighting, does not affect the line 19, by twisting it, or, by being well to the rear of the lure, in no manner damages the lure. Due to the provision of the bail 47, to which the body 11 is pivoted to swing in a vertical plane, the lure, or plug, will readily slip over grasses, and will smoothly slide over a log, or stone, over which it may be cast.

By removing the screws 28 the plate 27 may be readily removed to allow disassembly of the lure to replace worn parts or to change them. The removal of the pivot pin 32 permits the replacement of the trigger 34 and of the bead eyes 13. By providing parts, in a fish lure which are readily disassembled for replacement, the lure is inexpensive in up-keep, and by the use of standard hooks, and few parts of comparatively simple structure, the initial cost of the lure is comparatively small.

While there has been shown and described herein one form in which the features and principles of this invention may be embodied in practice, it is to be understood that they may be embodied in other specific forms without departing from the spirit and essential attributes thereof, and it is therefore desired that the present embodiment be considered in all respects as illustrative and not restrictive, reference being had to the claims rather than to the foregoing description to indicate the scope of the invention.

Having thus fully disclosed the invention, what is claimed as new and for which it is desired to obtain Letters Patent is:

1. A fish lure comprising, a generally cylindrical body said body having a bore formed therein and extending lengthwise therethrough for the greater part of the length of said body and being open at the rear end thereof, said body having an annular recess in the rear end surface thereof surrounding the bore therein, a spherical member slidably and rotatably disposed in the bore in said body, a shank extending rearwardly from said member and upon which said member is rotatable, said shank having a loop at its rear end, a hook having a barb and a shank, said hook barb being disposed in the annular recess and said hook shank extending forwardly into the bore in said body and swingably attached to the loop on the rearwardly extending shank, a coiled spring in the bore and acting on the spherical member to urge it rearwardly, a plate secured to the rear end face of said body, said plate having a hole therethrough of smaller diameter than the bore in said body to permit engagement of the spherical member with said plate to stop rearward movement of the member, a cross-bore formed in said body and communicating with said lengthwise bore, a releasable catch member extending through the cross-bore and into engagement with the rear portion of said spherical member, and an extension leading forwardly from said catch member along said body, then transversely through said body adjacent its front end to the other side thereof, and then rearwardly along the outside of said body to a point closely adjacent to the rear end thereof, said extension being pivoted to said body at the portion leading transversely through said body.

2. In a fish lure, a body member having a bore extending lengthwise thereinto from its rear end for the greater part of the length of said body, a fish hook having a shank, said shank extending forwardly into the bore in said body, spring pressed means acting on the hook shank to project the hook from said body and including a first catch member, a second catch member extending transversely into the body into engagement with the first catch member, said second catch member having an extension thereof leading forwardly along one side of said body and extending through said body adjacent its front end, and means to pivot said extension intermediate the sides of said body, said extension leading from adjacent the front end of said body rearwardly along and spaced outwardly from the other side of said body to a point closely adjacent to the rear end of said body to be engaged by a fish and pressed toward the body to swing the second catch member away from the first catch member to release the latter and allow projection of the hook from the body.

3. In a fish lure, an elongated body having means adapted to be ejected rearwardly therefrom, a trigger for actuating said means, a pin upon which said trigger is pivoted, said pin extending across said body, and a bail having ends extending one into each side of said body in alignment with said pivot pin to attach the bail to said body and retain said pin in said body.

4. In a fish lure, an elongated body having means adapted to be ejected rearwardly therefrom, a trigger for actuating said means, a pin upon which said trigger is pivoted, bead eyes inserted one in each side of said body, said pin extending across said body and part way into each bead eye, and a bail having ends with an end extending part way into each bead eye in alignment with said pin to attach the bail to said body and retain said pin in said body, said bail being spring tensioned to constantly urge its ends into the bead eyes.

JOHN R. COONEY.

REFERENCES CITED

The following references are of record in the file of this patent:

UNITED STATES PATENTS

| Number | Name | Date |
| --- | --- | --- |
| 184,792 | Mihan | Nov. 28, 1876 |
| 1,159,278 | Sampey | Nov. 2, 1915 |
| 1,627,512 | Hughes et al. | May 3, 1927 |
| 2,219,983 | Evenson | Oct. 29, 1940 |
| 2,445,461 | St. John | July 20, 1948 |
| 2,470,861 | Prentice | May 24, 1949 |

FOREIGN PATENTS

| Number | Country | Date |
| --- | --- | --- |
| 61,010 | Norway | 1939 |